US009503491B2

(12) United States Patent
Hurst et al.

(10) Patent No.: US 9,503,491 B2
(45) Date of Patent: Nov. 22, 2016

(54) PLAYBACK STALL AVOIDANCE IN ADAPTIVE MEDIA STREAMING

(71) Applicant: ECHOSTAR TECHNOLOGIES L.L.C., Englewood, CO (US)

(72) Inventors: Mark B. Hurst, Cedar Hills, UT (US); Herrick Muhlestein, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 373 days.

(21) Appl. No.: 13/843,411

(22) Filed: Mar. 15, 2013

(65) Prior Publication Data

US 2014/0280760 A1 Sep. 18, 2014

(51) Int. Cl.
H04L 29/06 (2006.01)
H04N 21/24 (2011.01)
H04N 21/238 (2011.01)
H04N 21/845 (2011.01)

(52) U.S. Cl.
CPC .......... H04L 65/60 (2013.01); H04L 65/4084 (2013.01); H04L 65/4092 (2013.01); H04L 65/80 (2013.01); H04N 21/23805 (2013.01); H04N 21/2401 (2013.01); H04N 21/8456 (2013.01)

(58) Field of Classification Search
USPC ....................................................... 709/219
See application file for complete search history.

(56) References Cited

U.S. PATENT DOCUMENTS

| 6,388,999 | B1 * | 5/2002 | Gorsuch | H04B 1/707 370/335 |
| 7,707,614 | B2 | 4/2010 | Krikorian et al. | |
| 7,818,444 | B2 | 10/2010 | Brueck et al. | |
| 7,940,843 | B1 | 5/2011 | Nie et al. | |
| 8,069,260 | B2 * | 11/2011 | Speicher | H04L 12/2838 381/386 |
| 8,099,755 | B2 * | 1/2012 | Bajpai | H04N 19/164 725/110 |
| 8,503,458 | B1 * | 8/2013 | Modi | H04J 3/0632 370/395.53 |
| 2002/0029274 | A1 * | 3/2002 | Allen | 709/226 |
| 2003/0156542 | A1 * | 8/2003 | Connor | H04L 12/40013 370/236 |
| 2004/0139215 | A1 * | 7/2004 | Lanphear | H04N 21/23406 709/232 |
| 2004/0186877 | A1 * | 9/2004 | Wang | H04L 29/06027 709/200 |
| 2005/0108399 | A1 * | 5/2005 | Bouknight, Jr. | H04L 47/36 709/226 |
| 2005/0262257 | A1 | 11/2005 | Major et al. | |
| 2006/0149850 | A1 * | 7/2006 | Bowman | G11B 27/10 709/231 |

(Continued)

FOREIGN PATENT DOCUMENTS

| EP | 2426923 A1 | 3/2012 |
| WO | 2006127391 A2 | 11/2006 |
| WO | 2012158365 A1 | 11/2012 |

OTHER PUBLICATIONS

European Patent Office, International Searching Authority, International Search Report and Written Opinion mailed May 15, 2014 for International Application No. PCT/US2014/026391.

Primary Examiner — Backhean Tiv
(74) Attorney, Agent, or Firm — LK Global

(57) ABSTRACT

Methods, systems and devices are described to avoid stalling during playback of an adaptive media stream delivered to a media player device over a network. The media device requests segments of the media stream that are received in a buffer. Buffer utilization is monitored over time to determine a rate of change, and future segment requests are adjusted based upon the determined rate of change in the buffer utilization. By making adjustments based upon the rate of change in buffer utilization, sudden changes that could otherwise affect the viewer's experience can be avoided.

16 Claims, 3 Drawing Sheets

(56) References Cited

U.S. PATENT DOCUMENTS

Figure 1:
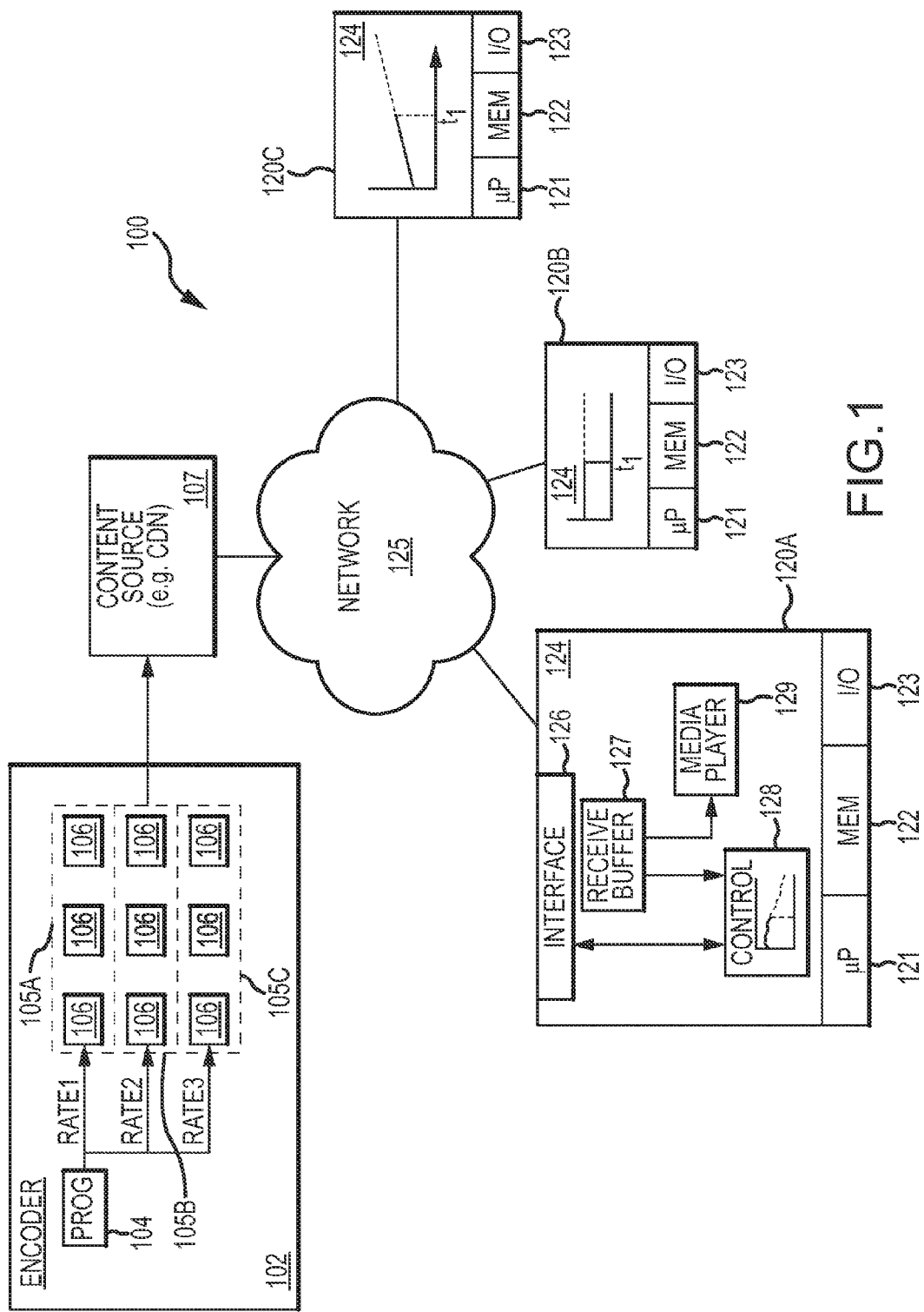

| Publication No. | Date | Inventor | Classification |
|---|---|---|---|
| 2007/0169149 A1* | 7/2007 | Jennings et al. | 725/58 |
| 2007/0177498 A1* | 8/2007 | Clark | H04L 47/10 370/229 |
| 2008/0148291 A1* | 6/2008 | Huang | G06F 9/545 719/320 |
| 2008/0191816 A1* | 8/2008 | Balachandran et al. | 333/24 R |
| 2008/0195743 A1 | 8/2008 | Brueck et al. | |
| 2008/0263218 A1* | 10/2008 | Beerends | H04L 29/06 709/230 |
| 2011/0078291 A1* | 3/2011 | Bickson | G06F 11/3409 709/221 |
| 2011/0093605 A1* | 4/2011 | Choudhury | H04L 65/4084 709/231 |
| 2012/0170760 A1* | 7/2012 | Virolainen | G10L 19/008 381/56 |
| 2012/0254364 A1* | 10/2012 | Vijayan | 709/219 |
| 2012/0297081 A1* | 11/2012 | Karlsson | H04L 65/4084 709/231 |
| 2012/0311171 A1* | 12/2012 | Holley et al. | 709/231 |
| 2013/0067052 A1* | 3/2013 | Reynolds | H04L 67/02 709/223 |
| 2013/0198322 A1* | 8/2013 | Oran | H04L 67/322 709/217 |
| 2013/0227122 A1* | 8/2013 | Gao | H04L 65/1083 709/224 |
| 2013/0227158 A1* | 8/2013 | Miller | H04L 65/60 709/231 |
| 2014/0012953 A1* | 1/2014 | Stoyanov | 709/219 |
| 2014/0019593 A1* | 1/2014 | Reznik et al. | 709/219 |
| 2014/0280760 A1* | 9/2014 | Hurst | H04L 65/60 709/219 |
| 2014/0344414 A1* | 11/2014 | Ozawa | 709/219 |

* cited by examiner

PLAYBACK STALL AVOIDANCE IN ADAPTIVE MEDIA STREAMING

TECHNICAL FIELD

The present disclosure generally relates to streaming media content over a data connection such as the Internet. More particularly, the following discussion relates to systems, methods and devices to improve the performance of adaptive media streaming.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, remote storage digital video recorder (RSDVR) services, Internet Protocol television (IPTV) services, placeshifted media viewing and/or any number of other convenient services. Generally, the media stream is played back for the viewer in real time as the stream continues to be delivered to the player.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate). Several examples of adaptive streaming systems, devices and techniques are described in US Patent Publication No. 2008/0195743, which is incorporated herein by reference.

Adaptive media streaming typically relies upon the media player client to control much of the streaming process. It is the media player client, rather than the server, that typically determines the next segment of the stream that will be requested and delivered to the player. While this player-centric approach provides excellent adaptability to the particular conditions experienced by the player, the client is often limited in that it only has a limited amount of information that can be used to determine which segment of the adaptive stream should be next requested. If network congestion, client or server overload or other issues are occurring, the player may not be able to react in time to prevent a stall in the video playback.

It is therefore desirable to create systems, devices and methods that allow the client device to better control the adaptive streaming process to prevent stalls and other adverse effects. These and other desirable features and characteristics will become apparent from the subsequent detailed description and the appended claims, taken in conjunction with the accompanying drawings and this background section.

BRIEF SUMMARY

Several examples of systems, devices and methods are described avoiding stalls during playback of an adaptive media stream. According to various embodiments, requested segments of an adaptive media stream are initially received in a buffer of the media player. The media player monitors the utilization of the receive buffer over time to determine a rate of change in the utilization of the buffer. This rate of change can be used to determine any needed adjustments to the quality of the requested media segments. If the buffer utilization is decreasing, for example, then lower quality segments can be requested to avoid emptying the buffer, thereby causing a stall in playback.

In some implementations, a method executable by a media player device to avoid a stall during playback of an adaptive media stream delivered over a network is provided. The method suitably comprises placing requests from the media player device for segments of the media stream to be delivered to the media device via the network, receiving the requested segments of the media stream in a receive buffer of the media player device for playback of the media stream by the media player device, monitoring a utilization of the receive buffer to determine a rate of change in the utilization of the receive buffer, and adjusting future requests for segments of the media stream based upon the determined rate of change in the utilization of the receive buffer.

Other implementations provide a media player device to playback an adaptive media stream delivered over a network. The media player device suitably comprises an interface to the network, a data storage configured to implement a receive buffer to receive incoming segments of the adaptive media stream, and a processor. The processor is configured to execute a control module that is configured to select segments of the adaptive media stream and to request the selected segments for delivery via the interface and initial storage in the receive buffer. The control module is further configured to monitor a utilization of the receive buffer to determine a rate of change in the utilization of the receive buffer and to adjust future requests for segments of the media stream based upon the determined rate of change in the utilization of the receive buffer. The processor further executes a media player module that is configured to obtain the segments of the adaptive media stream from the buffer and to render the obtained segments for playback.

These and other embodiments, aspects and other features are described in more detail herein.

BRIEF DESCRIPTION OF THE DRAWING FIGURES

Figure 2:
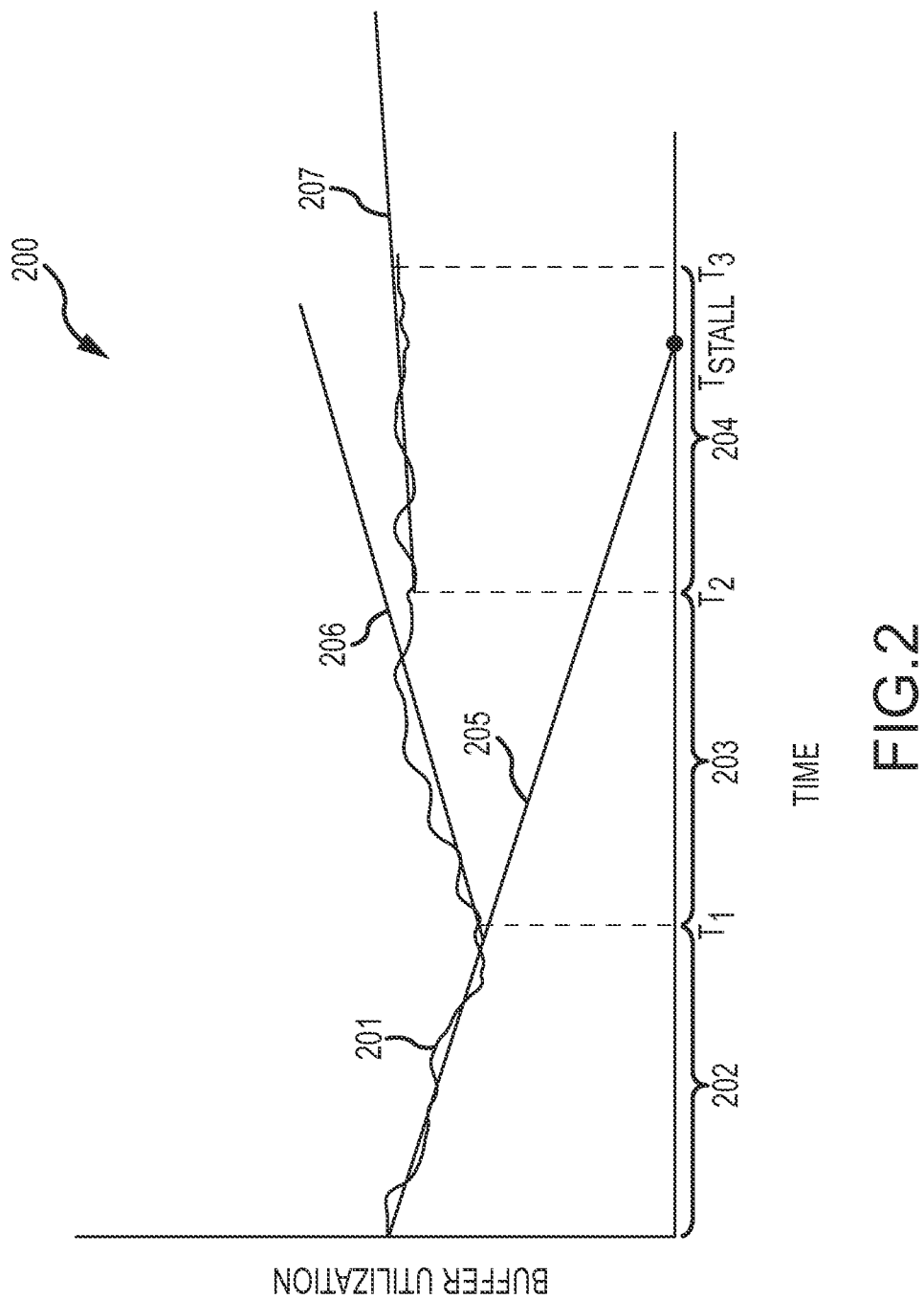
Figure 3:
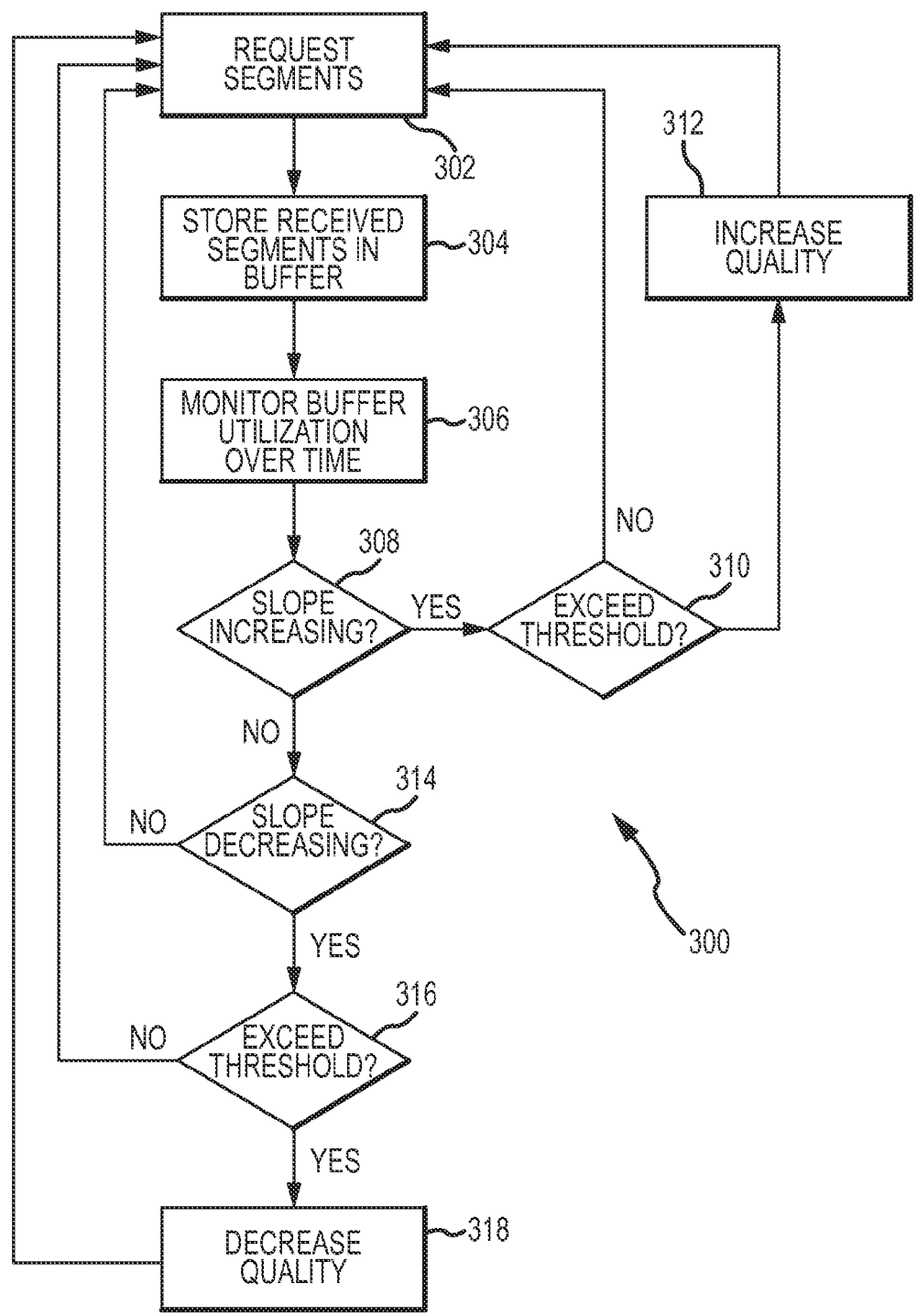

Exemplary embodiments will hereinafter be described in conjunction with the following drawing figures, wherein like numerals denote like elements, and FIG. 1 is a block diagram of an example system for estimating performance during media streaming across a data network; and FIG. 2 is a plot showing an example that uses buffer utilization over time to predict a future stall point during media streaming; and FIG. 3 is a flowchart showing an example of a process that could be used to avoid a stall during playback of an adaptive media stream.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a media player is able to adapt its requests for segments of a media stream to prevent stalling during playback based upon the utilization of the buffer that receives the requested segments of the stream. The media player monitors the rate at which the buffer fills or empties to determine the buffer utilization over some period of time. A linear regression or similar analysis can further point out a point in time that a stall may occur if the current performance level continues. This information can be compared to one or more threshold values to determine if the buffer is filling slower than desired, more quickly than desired, or at a desired rate. If the buffer utilization indicates that a stall is imminent, for example, then the media device can adapt its requests for future segments of the adaptive stream to obtain lower bandwidth content (e.g., content with a lower bitrate, frame rate, resolution and/or the like) so that enough programming content remains in the buffer to prevent a stall. This "downshifting" can be done on a gradual basis, as desired. Moreover, by monitoring a rate of decay over time rather than simply reacting to the buffer utilization at any given instant, smooth changes can be made to avoid sudden effects on the user experience while still preventing undesirable stalls in playback. Other embodiments may modify or supplement these broad concepts, as described more fully below.

Turning now to the drawing figures and with initial reference to FIG. 1, an exemplary system 100 to adaptively deliver media streams 105A-C to media player client devices 120A-C is shown. System 100 suitably includes an encoder 102 and a media server 114. Each client device 120A-C suitably requests segments 106 of a media program 104 that is hosted on network 125 by media server 114. As noted above, each client device 120A-C is able to monitor its receive buffer utilization, and to adjust the quality of the requested media segments 106 to prevent stalls during playback.

Encoder 102 and media server 114 in FIG. 1 may be jointly provided by a common service provider, or different service providers may work together to provide different components of the system 100 for delivering media content to various client devices 120A-C. A television network or other content provider could provide content that is already encoded in the appropriate formats, for example, thereby obviating the need for a separate encoder 102 in some implementations. Similarly, unicast and/or multicast hosting could be performed by any sort of content delivery network (CDN) or other service 114, as appropriate.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C each representing the same media program 104 in its entirety. Typically, each stream 105A-C is made up of smaller segments 106 that represent a small portion of the program in a single data file. Each stream 105A-C is typically encoded so that segments 106 of the different streams 105A-C are interchangeable with each other. That is, a client media player 120A-C can mix and match segments 106 from different streams 105A-C to continue seamless playback even as network conditions or other resources change.

Generally, the sets of segments 106 making up each stream 105 are stored on a content delivery network (CDN) or other server 114 for distribution on the Internet or another network 125. Typically, a media player application executing on one or more client devices 120A-C contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 120 initially obtains a digest or other description of the available segments so that the player itself can request the segments 106 as needed. Often, segment requests and the like can be processed using conventional hypertext transport protocol (HTTP) constructs such as HTTP "get" and "put" constructs that are readily routable on network 125 and that can be handled by conventional CDN or other web-type servers 110. Although FIG. 1 shows only a single server 114, many implementations could spread streams 105 and/or segments 106 across any number of servers 114 for convenient delivery to clients 120A-C located throughout network 125.

Each client device 120A-C is any sort of media player client capable of receiving streaming media content via network 125. In various embodiments, client devices 120A-C could be mobile phones or other portable devices, computer systems executing media player applications 129, tablet or notebook computers, video game players, stand-alone media player devices, television receivers, video recorders and/or any number of other consumer-controlled devices that are operated by individual users. To that end, each media player device 120A-C includes a processor 121, memory 122 or other mass storage, and hardware input/output interfaces 123 as desired.

Typically, each media player 120A-C typically executes its own software 124 that is able to adaptively request segments 106 belonging to any of the different streams 105A-C associated with a program 104 that is being presented to the viewer. Software 124 is typically stored in memory 122 or other mass storage associated with the client device 120 for execution on processor 121. As illustrated in FIG. 1, software 124 typically includes a network interface 126 to network 125, a receive buffer 127 for storing received segments 106 of the media stream, a media player application 129 that renders the received media stream for playback to the user, and a control module 128 that performs various functions relating to requesting and processing the various segments 106 of the adaptive media stream. In particular, control module 128 is able to monitor the utilization of buffer 127 over time to determine a rate at which the buffer utilization is changing. Control module 128 may also use the buffer utilization rate to extrapolate a stall point, or to otherwise quantify the buffer utilization for use in requesting future segments of the media stream, as described more fully below.

The various components of software 124 may be implemented in any manner. Buffer 127, for example, may be a logical structure that makes use of physical storage in memory 122 or the like for segments 106 that are received from content source 107. Interface 126 similarly uses hardware interfaces 123 to transmit and receive data on network 125. Media player devices 120A-C may have alternate hardware or software components, as desired.

In operation, then, each media player 120A-C suitably requests segments 106 of an adaptive media stream representing programming content 107. As the requested segments 106 are received, they are stored in a receive buffer 127 until they are requested for playback by the media player application 129. Control module 128 of software 124 monitors the utilization of buffer 127 over time, and adapts future segment requests as needed to prevent the buffer from becoming depleted.

FIG. 2 shows a plot 200 with example values of buffer utilization 201 that are observed over three time periods 202, 203 and 204. In the first time period 202, the buffer utilization 201 is generally declining, and could lead to an eventual playback stall at time $T_{stall}$ if the then-current conditions were to continue. In the second time period 203, the buffer utilization 201 is generally increasing, which could potentially lead to an over-full buffer if left unchecked. In the third time period 204, the buffer utilization 201 is relatively constant, indicating that segments 106 are being removed from the buffer 127 at approximately the same rate that new segments 106 are arriving.

During time period 203, the buffer utilization 201 is generally declining, which indicates that segments 106 are being removed for playback more quickly than new segments 106 are arriving from the content source 107. Line 205 in the example of FIG. 2 represents a linear regression of the buffer utilization 201 over time period 203. The slope of this linear regression 205 is negative, indicating that the receive buffer 127 is generally emptying. This slope may be calculated in any manner; in one example, the slope (m) of the line could be determined by simply tracking the differences between consecutive buffer measurements (U) over an appropriate time period T. This is represented by the following equation:

$$m = \Sigma_{t=1}^{T}(U_t - U_{t-1}) \quad (1)$$

If the calculated slope is negative in sign, then the buffer 127 is emptying, and that a stall point would occur when the buffer reached zero utilization, indicating that all of the buffered content had been depleted. This would occur at a time that is predicted by the following equation:

$$T_{stall} = -\frac{U_T}{m} \quad (2)$$

where UT represents the current buffer utilization and m represents the calculated slope of line 205. Other linear regression and extrapolation techniques could be equivalently used in any number of other embodiments.

In most instances, it would be desirable to avoid depleting buffer 127. Control module 128 will therefore typically react to a negative slope by requesting segments 106 that consume less bandwidth than those previously requested. Segments 106 with a lower bit rate, frame rate, resolution or the like will generally reduce the amount of memory used. Additionally, the lower bandwidth segments 106 will typically be delivered faster than higher bandwidth equivalents over the same network, thereby leading to an increase in buffer utilization 201 and most likely avoiding a stall in playback.

Time period 203 of FIG. 2 shows a time in which the buffer utilization 201 is increasing. This may reflect, for example, a shift to lower bandwidth segments 106, a change in network conditions, a change in processing resources available to the media player 129, or any number of other factors. This increased buffer utilization is indicated by linear projection 206, which has a positive slope. In some implementations, it may be desirable to prevent excessively positive slopes, particularly when the buffer utilization 201 is already relatively high, to prevent buffer overflows. In such cases, control module 128 could shift to requesting higher bandwidth segments 106, which will typically arrive more slowly than lower-bandwidth segments 106 transmitted over the same network 125. Each higher-bandwidth segment 106 could consume more space in the buffer 127 upon receipt, but this excess data would also be removed more quickly from the buffer 127 as media player 129 removed each segment 106. The slower arrival rate and faster consumption rate could lead to better matching between the rate that segments 106 arrive from source 107 and the rate at which segments 106 are removed for playback, and ultimately a more stable buffer utilization 201. During time period 204 of FIG. 2, the buffer utilization 201 is relatively stable, as indicated by linear projection 207.

Although FIG. 2 shows three separate time periods 202, 203 and 204 to illustrate different behaviors of receive buffer 127, in practice it will generally be desirable to perform the linear regression or other analysis over a sliding time window that considers the most recently received data. The starting and ending points and/or durations for analysis would be determined from observation, and may vary substantially from embodiment to embodiment. Observation durations could last from a few seconds in some implementations to a few minutes in others. Typically, it is desirable to set the duration so that minor short-term effects do not produce substantial changes in behavior, yet longer term trends (e.g., gradual declines in utilization 201) are identified and corrected before stalls or other adverse effects occur.

The general concepts of monitoring buffer utilization 201 and adapting segment requests based upon observed behavior may be supplemented with other factors as desired. The rate of change may be used in conjunction with the actual buffer utilization, for example, to make more accurate performance adjustments. If the buffer is relatively full, for example, it may be desirable to allow a buffer-depleting trend to continue until buffer utilization becomes more moderate. Similarly, if the buffer is relatively empty, it may be desirable to continue a buffer filling trend until the buffer holds a desired amount of data. It may also be desirable to limit the frequency of changes so that the effects of such changes can be monitored.

Turning now to FIG. 3, an exemplary process 300 is executable by the media player application 124 or elsewhere in client device 120 to avoid stalls during playback of the media stream. Generally speaking, the media player device 120 requests segments 106 of a media stream from a content source 107 via network 125 (function 302). As noted above, segments 106 may be requested using conventional HTTP "get" constructs or the like. As segments 106 are received at the media device 120, they are stored in buffer 127 (function 304) until they are retrieved by the media player application 129 for playback.

As noted above, the media device 120 monitors buffer utilization over time to determine if the segment quality should be adjusted (function 306). This monitoring may involve storing buffer utilization measurements for any appropriate time, as noted above, to permit a sliding analysis of the buffer over the most recent period of time. In some implementations, the analysis includes performing a linear regression, such as the regression described in equations (1) and (2) above, to predict a stall time and/or a time when the buffer could overflow. Other embodiments could use other mathematical techniques for monitoring rates of change in the buffer utilization, as desired.

As noted above, it may be desirable to increase the quality of each requested segment 106 when the buffer utilization is decreasing. When the rate of buffer utilization is increasing, the slope of line 206 will be positive (function 308). This slope may be calculated, for example, using equation (1) above, or using any other technique. Minor variations in slope may be ignored at least temporarily in some implementations. Variations that are larger than a threshold value, however, will trigger a change in segment quality (function 310). The particular threshold value will be determined experimentally or otherwise, depending upon the desired responsiveness to changes in utilization 201. Higher thresholds, in general, will be slower to react to gradual changes in buffer utilization, but will be less likely to respond to minor fluctuations. The segment quality 106 may be adjusted (function 312) by simply identifying a stream 105A-C in a digest or the like encoded with a higher bit rate or other quality parameter, and then requesting future segments 106 from the higher-quality stream.

Conversely, it will typically be desirable to request lower quality segments when buffer utilization is decreasing (function 314). As noted above, the rate of change in buffer utilization generally corresponds to the slope of line 204, which can be calculated using equation (1) or the like. Minor fluctuations in the rate of change can be ignored, as desired, by comparing the slope to a threshold value (function 316), similar to the comparison made in function 310 above. The particular threshold value may be selected based upon the particular implementation to make the detection more or less sensitive to minor changes in buffer utilization and to prevent sudden changes in quality that may be perceptible to the user.

If the buffer utilization is decreasing at a rate that exceeds the threshold, however, then media device 120 suitably decreases the quality of segments 106 identified in future segment requests (function 318). As noted above, the lower quality segments 106 will typically arrive faster than the higher quality segments, thereby leading to a fuller buffer 127.

The particular functions 302-318 shown in FIG. 3 may be executed within control module 128 or another portion of software 124 executing on each client device 120A-C. Other embodiments may be supplemented or modified in any number of equivalent ways to achieve similar results as those described herein.

The term "exemplary" is used herein to represent one example, instance or illustration that may have any number of alternates. Any implementation described herein as exemplary is not necessarily to be construed as preferred or advantageous over other implementations, or as a model that must be exactly duplicated. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is presently claimed is:

1. A method executable by a media player device to avoid a stall during playback of an adaptive media stream delivered over a network, the method comprising:
   placing requests by the media player device for segments of the media stream to be delivered to the media player device via the network;
   receiving the requested segments of the media stream in a receive buffer of the media player device for playback of the media stream by the media player device;
   monitoring, by the media player device, a utilization of the receive buffer over a period of time to determine a rate of change in the utilization of the receive buffer over the period of time, wherein the monitoring comprises the media player device performing a linear regression of the buffer utilization and extrapolating a line determined by the linear regression to identify a future point in time when the receive buffer will be empty, wherein the future point in time lies outside the period of time; and
   adjusting future requests for segments of the media stream by the media player device, wherein the future requests for segments are based upon the determined rate of change in the utilization of the receive buffer over the period of time.

2. The method of claim 1 wherein the adjusting comprises the media player device placing future requests for future segments having a lower quality than the received segments when the rate of change in the utilization of the receive buffer shows a declining buffer utilization over the period of time.

3. The method of claim 2 wherein the adjusting comprises the media player device placing future requests for future segments having a higher quality than the received segments when the rate of change in the utilization of the receive buffer shows an increasing buffer utilization over the period of time.

4. The method of claim 1 wherein the adjusting comprises the media player device placing future requests for future segments having a higher quality than the received segments when the rate of change in the utilization of the receive buffer shows an increasing buffer utilization over the period of time.

5. The method of claim 1 wherein the monitoring comprises the media player device monitoring a moving time scale of the buffer utilization that reflects changes over multiple periods of time.

6. The method of claim 1 further wherein the adjusting comprises the media player device comparing the determined rate of change in the buffer utilization over the period of time to a threshold level and changing the quality level of the future segments when the rate of change over the period of time passes the threshold level.

7. The method of claim 1 further wherein the adjusting comprises the media player device comparing the determined rate of change in the buffer utilization over the period of time to each of a plurality of threshold levels and changing the quality level of the future segments when the rate of change over the period of time passes any of the threshold levels.

8. A media player device to playback an adaptive media stream delivered over a network, the media player device comprising:
   an interface to the network;
   a data storage configured to implement a receive buffer to receive incoming segments of the adaptive media stream; and
   a processor configured to execute:
      a control module configured to select segments of the adaptive media stream and to request the selected segments for delivery via the interface and initial storage in the receive buffer, wherein the control module is further configured to monitor a utilization of the receive buffer over a period of time to determine a rate of change in the utilization of the receive buffer over the period of time by performing a linear regression of the buffer utilization and extrapolating a line determined by the linear regression to identify a future point in time when the receive buffer will be empty, wherein the future point in time lies outside the period of time, and to adjust future requests for segments of the media stream based upon the determined rate of change in the utilization of the receive buffer over the period of time; and
      a media player configured to obtain the segments of the adaptive media stream from the buffer and to render the obtained segments for playback.

9. The media player device of claim 8 wherein the control module is further configure to adjust the future requests by placing future requests for future segments having a lower quality than the received segments when the rate of change in the utilization of the receive buffer shows a declining buffer utilization over the period of time.

10. The media player device of claim 9, wherein the control module is further configure to adjust the future requests by placing future requests for future segments having a higher quality than the received segments when the rate of change in the utilization of the receive buffer shows an increasing buffer utilization over the period of time.

11. The media player device of claim 8 wherein the control module is further configure to adjust the future requests by placing future requests for future segments having a higher quality than the received segments when the rate of change in the utilization of the receive buffer shows an increasing buffer utilization over the period of time.

12. The media player device of claim 8 wherein the control module is further configure to adjust the future requests by monitoring a moving time scale of the buffer utilization that reflects changes over multiple periods of time.

13. The media player device of claim 8 wherein the control module is further configure to compare the determined rate of change in the buffer utilization over the period of time to a threshold level and to change the quality level of the future segments when the rate of change passes the threshold level.

14. The media player device of claim 8 wherein the control module is further configure to compare the determined rate of change in the buffer utilization over the period of time to each of a plurality of threshold levels and to change the quality level of the future segments when the rate of change passes any of the threshold levels.

15. The media player device of claim 8 further comprising a display configured to playback the media stream rendered by the media player.

16. The media player device of claim 8 wherein the control module and the media player are implemented with computer-executable instructions that are stored in the data storage and executed by the processor.

* * * * *